United States Patent [19]

Lewis et al.

[11] Patent Number: 4,782,657
[45] Date of Patent: Nov. 8, 1988

[54] VARIABLE AREA AIRCRAFT AIR INTAKE

[75] Inventors: William J. Lewis, Somerset; Clifford S. Woodward, Bristol, both of England

[73] Assignee: Rolls-Royce PLC, London, England

[21] Appl. No.: 73,161

[22] Filed: Jul. 14, 1987

[30] Foreign Application Priority Data

Jul. 25, 1986 [GB] United Kingdom ............... 8618166

[51] Int. Cl.⁴ .............................................. F02K 3/02
[52] U.S. Cl. ................................ 60/226.1; 60/226.3; 60/229; 60/39.161; 137/15.1
[58] Field of Search ............... 60/226.1, 229, 232, 60/263, 226.3, 225, 39.161; 137/15.1; 239/265.27, 265.29; 244/53 B, 12.5

[56] References Cited

U.S. PATENT DOCUMENTS

| 3,913,321 | 10/1975 | Snell | 60/226.3 |
| 4,038,818 | 8/1977 | Snell | 60/226.3 |
| 4,587,803 | 5/1986 | Nightingale et al. | 60/226.1 |
| 4,641,678 | 2/1987 | Haas et al. | 137/15.1 |

FOREIGN PATENT DOCUMENTS

| 2545019 | 4/1977 | Fed. Rep. of Germany | 137/15.1 |
| 1217955 | 5/1960 | France | 244/53 B |
| 890703 | 3/1962 | United Kingdom. | |
| 890547 | 3/1962 | United Kingdom. | |
| 1102571 | 2/1968 | United Kingdom. | |
| 1274026 | 3/1972 | United Kingdom. | |
| 2155413A | 9/1985 | United Kingdom. | |

Primary Examiner—Donald E. Stout
Attorney, Agent, or Firm—Parkhurst, Oliff & Berridge

[57] ABSTRACT

One problem associated with aircraft using variable cycle engines is how to provide an air intake which is sufficiently large to be able to supply air to both the first and second compressors of the engine during the parallel flow mode and sufficiently small to minimize aerodynamic drag when the engines are operated in the tandom flow mode during supersonic forward flight. This invention overcomes this problem by providing an air intake which combines a blocker door covering a second portion of the duct which communicates with the second compressor and a means of varying the inlet area of the duct such that the area is maximize when the engines are required to operate in the parallel flow mode and minimized during series flow operation.

3 Claims, 4 Drawing Sheets

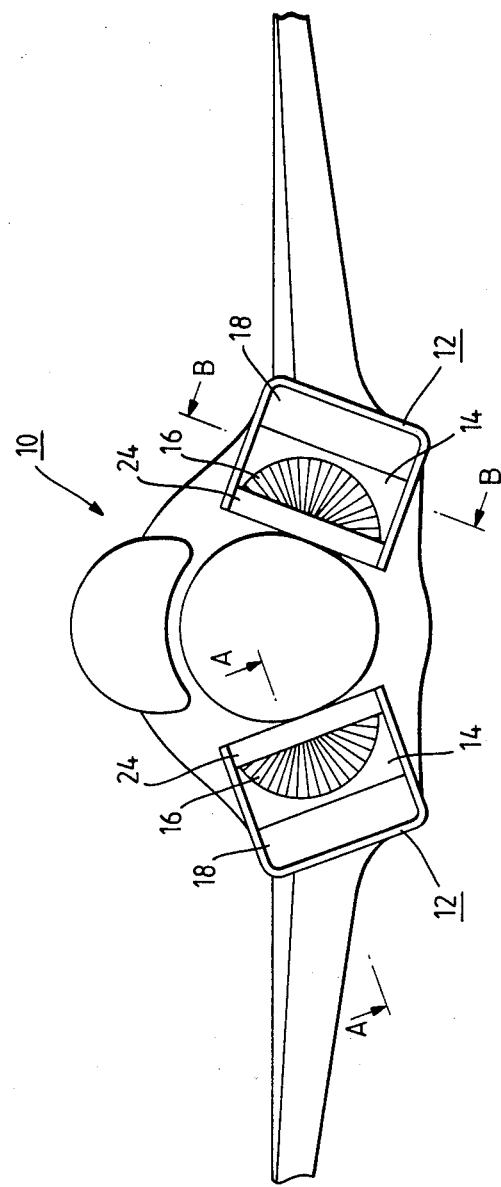

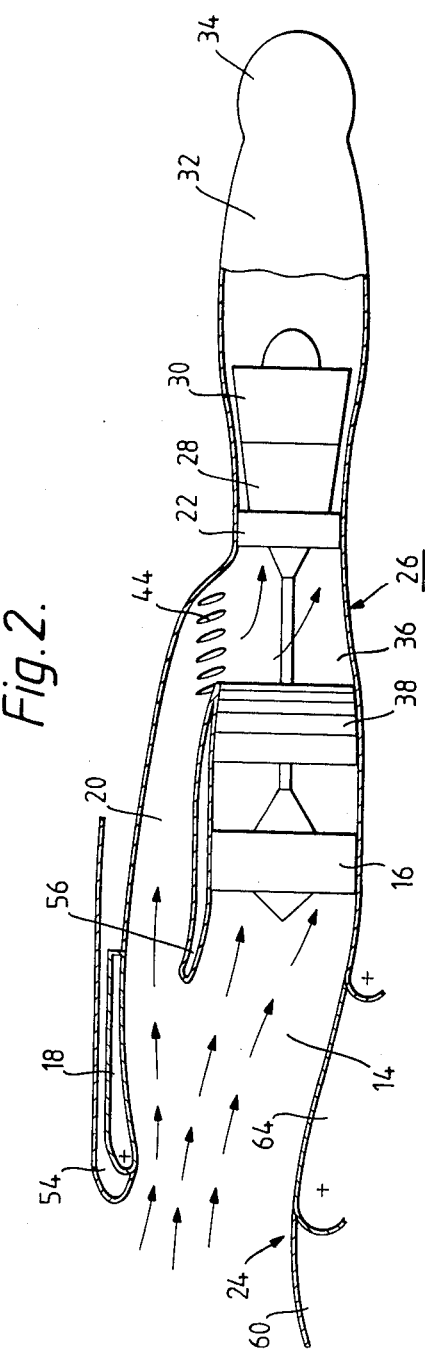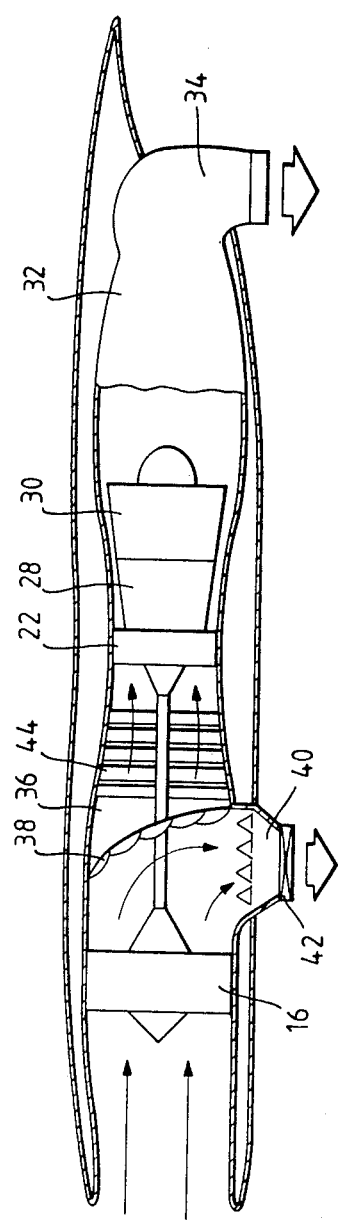

VARIABLE AREA AIRCRAFT AIR INTAKE

This invention relates to variable cycle gas turbine engines, and in particular to air intakes for selectively changing the direction of flow of the working fluid into the engine.

The present invention is particularly concerned with variable cycle engines of the type generally disclosed in U.S. Pat. Nos. 3,913,321 or 4,038,818 (assigned to Rolls-Royce plc). In general, these engines comprise a first axial flow compressor and a core engine comprising, in flow series, a second compressor, combustion equipment and turbines to drive the first and second compressors, and the engine is capable of operating in two distinct modes. These modes are namely a "series flow" mode and a "parallel flow" mode. In the series flow mode the first and second compressors are connected in flow series and the whole output flow of the first compressor supercharges the second compressor. In the parallel flow mode the output flow from the first compressor is prevented from supercharging the second compressor and is discharged to ambient air through either a by-pass duct or through fixed or vectorable discharge nozzles whilst simultaneously an auxilliary air intake is opened to allow air to enter the second compressor.

One major problem associated with an aircraft which incorporates engines of the above type is how to provide an air intake which is large enough to supply sufficient air to both the first and second compressors during the parallel mode of operation and small enough to reduce aerodynamic drag to a minimum during supersonic forward flight when the engines operate in series flow mode.

This invention attempts to overcome the above mentioned problems by providing an air intake which is capable of altering its intake area in accordance with the engines airflow requirements and which minimizes its frontal area and hence drag during supersonic forward flight.

The present invention will now be more particularly described by way of example only with reference to the accompanying drawings, in which:

FIG. 1 is a front elevation of an aircraft incorporating the present invention.

FIG. 2 is a cross sectional view of a twin fan engine and the air intake taken in the direction of arrows A—A in FIG. 1, and shows the engine operating in the parallel flow mode.

FIG. 3 is a cross-sectional view of an engine and its associated air intake, taken in the direction of arrow B—B in FIG. 1.

Figure 4:
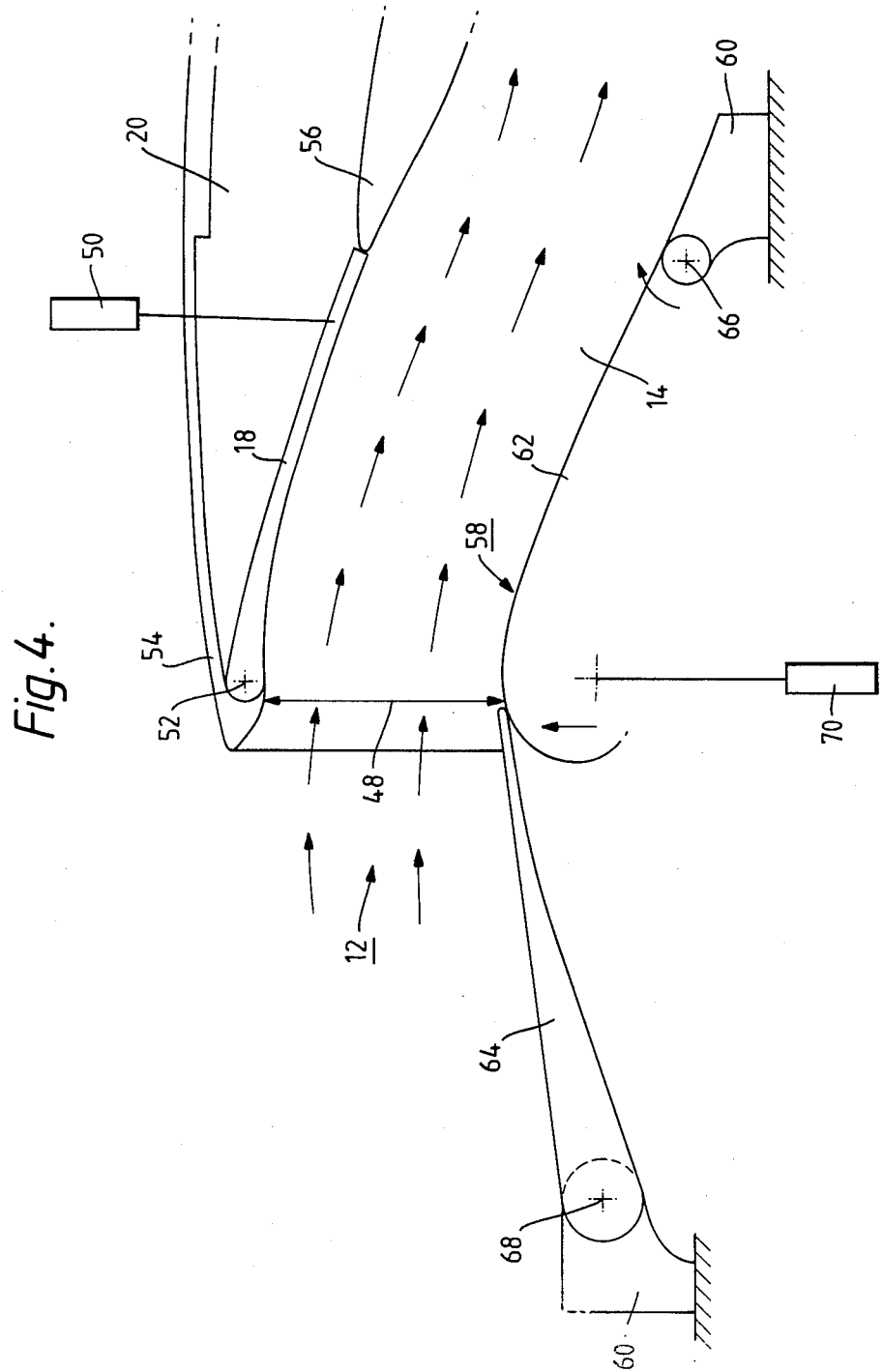
FIG. 4 is an enlarged cross sectional view of the intake shown in FIG. 3 in its series flow position.

Referring to FIGS. 1 and 2, an aircraft shown generally at (10) is provided with at least one air intake (12) having an inlet area (48) and a first and second duct area (14 and 20) respectively, an obturator door (18) which acts to cover and uncover a second duct (20) which supplies air to a second axial flow compressor (22) and an intake area varying mechanism shown generally at (24).

Referring now to FIG. 2 and 3, the engine shown generally at (26) comprises a first axial flow compressor (16) and a core engine comprising a second axial flow compressor (22) combustion equipment (28) and turbine means (30) to drive the first and second compressors (16 and 22) respectively. An exhaust duct (32) having a vectorable rear nozzle (34) is provided downstream of the turbine means (30). The first and second axial flow compressors (16 and 22) are spaced apart from each other by a chamber (36), an upstream end of which is provided with a means (38) for directing air from the first compressor (16) to either the second compressor (22) or to a vectorable exhaust nozzle (40). The nozzle (40) is provided with an obturator means (42) which acts to obturate the nozzle in the series flow mode. The downstream end of the second duct (20) communicates with the downstream end of the chamber (36) and is provided with a means (44) for obturating the duct (20) when the engine is operated in the series flow mode.

Figure 5:
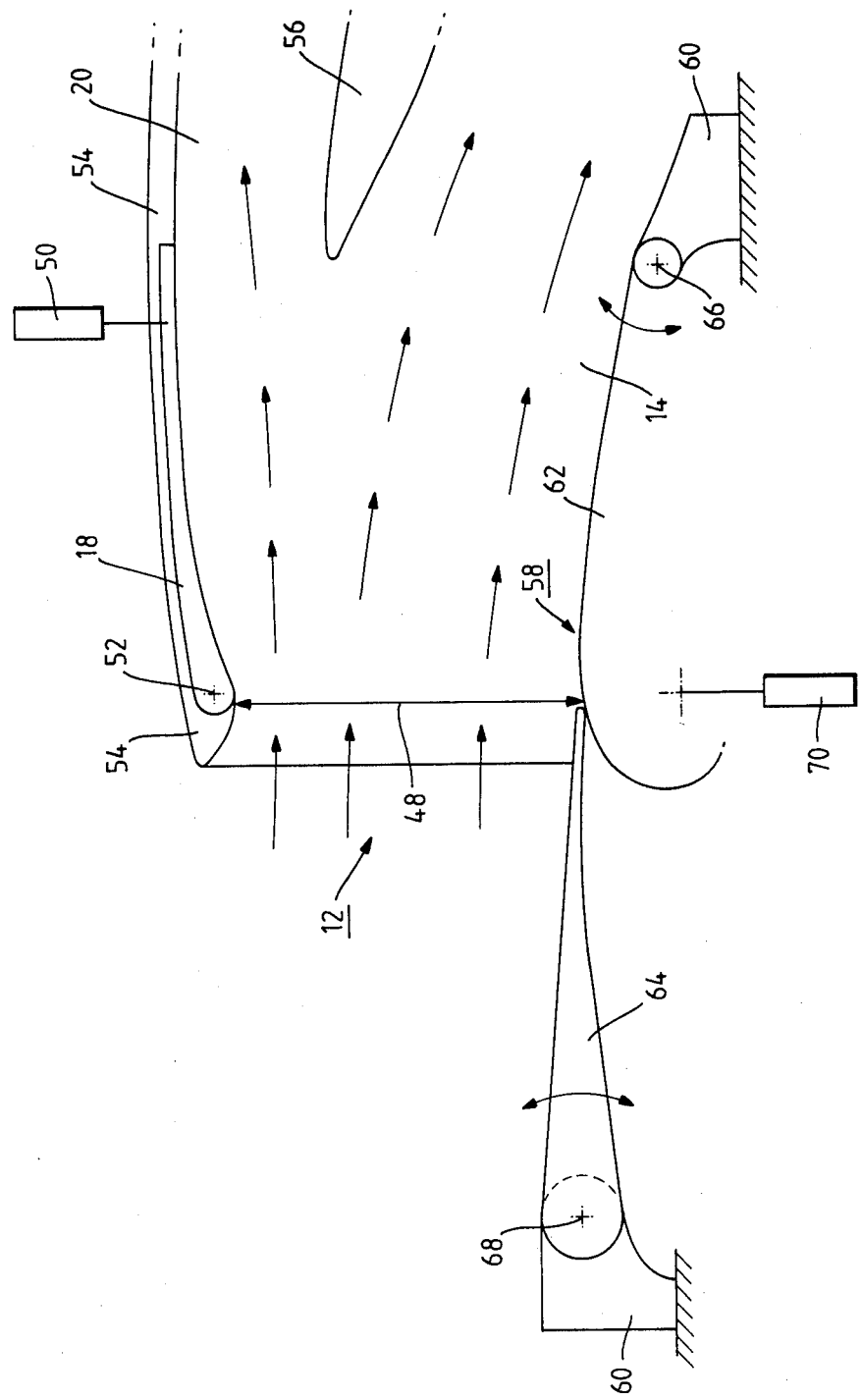
FIG. 5 is an enlarged cross sectional view of the intake shown in FIG. 3 in its parallel flow position.

Referring now particularly to FIGS. 4 and 5, the intake shown generally at (12) comprises an inlet opening (48) which communicates with an inlet duct having a first and a second portion, (14,20) respectively, the first portion (14) being positioned to communicate with the first compressor (16) and the second portion (20) being positioned to communicate with the second compressor (22) and a blocker door (18). The blocker door (18) is situated at the upstream end of the duct's second portion (20) and acts in a first position to obturate the second portion (20) and uncover second portion (20) in a second position. Actuation means, shown schematically at (50) are provided to move the blocker door (18) between its first and second positions when desired. The door may be hinged at an upstream end (52) to a fixed outside portion of the duct wall (54) and communicate with a second portion of the duct wall (56) at their downstream ends. The second portion of the duct wall (56) effectively divides the duct into its first and second portions (14 and 20) respectively.

The inside portion of the duct wall, shown generally at (58) comprises a fixed portion formed by for example a portion of the aircraft fuselage and shown at (60) and a first and second movable portion (62 and 64) respectively. The first movable portion (62) is pivotably mounted at its downstream end to a point (66) on the aircraft fuselage whilst its upstream end acts to define the area of the inlet opening (48) and is pivotable about point (66). The second movable portion (64) is pivotably connected at its upstream end to a point (68) on the aircraft fuselage (60) and is linked at its downstream end to move with the upstream end of the first portion (62) and acts as a fairing for the first movable portion (62). actuator means shown schematically at (70) are provided to move the upstream end of the first portion (62) from a first position where it reduces the area of the inlet opening (48) (best seen in FIG. 4) to a second position in which it increases the area of the inlet opening (FIG. 5).

When it is required to operate the engine (26) in its series flow mode, the door (18) and the first movable portion of the inner wall (62) are moved to their first positions (FIG. 4) where they obturate the second portion of the duct (20) and partially obturate the inlet opening (48) respectively. This reduces the inlet area and hence the drag associated with it whilst still allowing sufficient air to be directed to the first compressor. It will be appreciated that when it is required to operate the engine (26) in the parallel flow mode, ie when vertical thrust is required, the door (18) and first movable portion of the inner duct wall (62) are moved to their second positions (FIG. 5) where they uncover the second portion of the duct (20) and increase the area of the inlet opening (48) to a maximum respectively. This allows the inlet area to pass sufficient air for both the first and second compressors (16,22). The increase in the area of the inlet opening (48) will have little effect on the drag associated with it as the aircraft will have little or no forward velocity when the engine (26) is operated in this mode.

We claim:

1. An aircraft air intake for supplying air to a first compressor and a second compressor of a gas turbine engine capable of operating in either a series flow mode or a parallel flow mode, the air intake comprising:
   an inlet opening;
   an inlet duct, which communicates with the inlet opening and which has a first portion which communicates with the first compressor and a second portion which communicates with the second compressor;
   an obturator door, which in a first position acts to obturate the second portion and in a second position acts to uncover the second portion; and
   a means for altering the area of the inlet opening in accordance with the airflow requirements comprising a movable member having an upstream end and a downstream end, said downstream end being pivotally attached to a fixed point on the aircraft and said upstream end being translatable across the inlet opening from a first position in which it reduces the area of the inlet opening to a second position in which it increases the area of the inlet opening.

2. An aircraft air intake as claimed in claim 1 in which the movable member is furthr provided with a fairing member having an upstream end and a downstream end, said downstream end being linked to move with the upstream end of said movable member and said upstream end being pivotally linked to a fixed portion of the aircraft upstream of said movable member.

3. An aircraft air intake as claimed in claim 1 in which the obturator door acts to obturate the second portion of the inlet duct when the movable member is in its first position and uncover the second portion of the inlet duct when the movable member is in its second position.

* * * * *